(12) United States Patent
Cox

(10) Patent No.: US 7,299,729 B2
(45) Date of Patent: Nov. 27, 2007

(54) ROTARY DIE MODULE

(76) Inventor: William A. Cox, 2387 Hidden Lake Ct., West Bloomfield, MI (US) 48324

( * ) Notice: Subject to any disclaimer, the term of this patent is extended or adjusted under 35 U.S.C. 154(b) by 0 days.

(21) Appl. No.: 09/863,181

(22) Filed: May 23, 2001

(65) Prior Publication Data

US 2002/0174753 A1    Nov. 28, 2002

(51) Int. Cl.
*B26D 1/62* (2006.01)
(52) U.S. Cl. ............................. 83/343; 83/563
(58) Field of Classification Search .......... 83/343–347, 83/563; 72/239, 238, 252.5; 483/16; 76/107.1, 76/115
See application file for complete search history.

(56) References Cited

U.S. PATENT DOCUMENTS

| | | | |
|---|---|---|---|
| 661,470 A | 11/1900 | Fawell et al. | |
| 1,712,575 A | 5/1929 | McArthur | |
| 3,208,260 A | 9/1965 | Sieger et al. | |
| 3,747,387 A | 7/1973 | Shumaker | |
| 4,155,240 A * | 5/1979 | Okuda et al. | 72/239 |
| 4,452,116 A * | 6/1984 | Kesten | 83/346 |
| 4,455,903 A | 6/1984 | Kesten | |
| 4,507,996 A | 4/1985 | Kesten | |
| 4,553,461 A * | 11/1985 | Belongia | 83/344 |
| 4,638,934 A | 1/1987 | Fram | |
| 4,759,247 A * | 7/1988 | Bell et al. | 83/346 |
| 4,770,078 A | 9/1988 | Gautier | |
| 4,922,778 A | 5/1990 | Nagai | |
| 5,058,472 A | 10/1991 | Kakko-Chiloff | |
| 5,156,076 A * | 10/1992 | Rosemann | 83/344 |
| 5,174,185 A * | 12/1992 | Aichele | 83/346 |
| 5,207,138 A | 5/1993 | Sato et al. | |
| 5,467,678 A | 11/1995 | Stollenwerk | |
| 5,488,889 A | 2/1996 | Kang | |
| 5,595,093 A | 1/1997 | Kapolnek | |
| 5,704,284 A | 1/1998 | Stollenwerk | |
| 6,055,897 A | 5/2000 | Mysliwiec | |
| 6,067,887 A | 5/2000 | Kapolnek | |

OTHER PUBLICATIONS

Rotary Die Module & Rotary Dies; frame manufactured by: RPM Systems of Troy Michigan (now Tri-Tool Boring Mach. Co. of Chesterfield Twp., Michigan); Rotary dies and bearing blocks manufactured by Altantic Eagles, Inc. of Farmington Hills, Inc. (now Bernal Technologies of Rochester Hills, Michigan); 1995.
Stevens International/Bernal Division advertisement reprinting a portion of the Jul. 1995 Converting Magazine (a Cahners Publication).

* cited by examiner

*Primary Examiner*—Kenneth E. Peterson
(74) *Attorney, Agent, or Firm*—Young Basile

(57) ABSTRACT

A die apparatus for supporting and retaining rotary dies in operation having a base, a cover supported by a plurality of columns, a cross member moveable along the columns and modular die supports rollingly engaged with the rotary dies. A method of installing and removing the rotary dies from the apparatus includes moving the dies along a first axis of movement within the apparatus through use of a support strap and moving the dies to and from the apparatus through use of a conveyor.

4 Claims, 8 Drawing Sheets

ROTARY DIE MODULE

FIELD OF THE INVENTION

The present invention relates to die cutting assemblies and more particularly to die module assemblies that support and retain rotary cutting dies. The invention further relates to methods of installing and removing the rotary cutting dies in die modules.

BACKGROUND OF THE INVENTION

With the advancement of high volume manufacturing of relatively thin, pliable materials, die cutting machines employing cylindrically-shaped rotary cutting dies have gained increased usage. Rotary die modules or frames which support and retain the cutting die rolls in operation typically consist of thick, rigid, machined steel bases, top plates and sidewalls. The sidewalls typically require a U-shaped vertical slot opening to the top of the sidewall and frame which are closed when the top plates are secured to the sidewalls. The sidewalls and slots are required to be machined to close tolerances to precisely locate bearing blocks on each end of the rolls to properly align and maintain position of the cutting rolls related to one another both in rotation and in linear movement along their axes of rotation. Prior design frames are typically welded or securely bolted together requiring significant time and effort to disassemble them to change or service the dies or frame.

Other known devices have improved upon modules requiring two bearing blocks per roll, but still rely on heavy machined steel frames and bearing blocks on at least one end of the die roll to support and control rotation of the dies relative to the frame and one another. Prior art modules are limited in their flexibility of adapting to different die rolls, die diameters and applications such as high versus low speed operations. The lack of adaptability stems from machined steel frames, integration of the die supports with the frame, and reliance on bearing blocks to support and retain the die rolls in operation.

To install or change the die rolls in the known die modules described above, the top plate is typically removed and each die with attached bearing blocks is loaded into the frame from the top with an overhead lifting device or hoist. The bearing blocks are precisely positioned in the unshaped slots in the sidewalls. Precision spacer blocks are used to vertically position the bearing blocks and thus, the dies in the sidewalls of the frame. A set of spacers is typically placed in the slots on top of the lower die roll bearing block to separate the lower roll from the upper die roll. The spacers require precise machining to properly space the cutting blades on the die rolls from one another. Once the die rolls are positioned, the top plate is secured to the sidewalls and pressure screws compress the stack of spacers and bearing blocks to prevent movement. The die rolls are supported by the frame and rotate about the bearing blocks attached to the dies.

If a die roll needed to be removed, the top plate and the stack of bearing blocks and spacers would need to be removed from the top of the frame by an overhead hoist and the new die installed. This would require completely readjusting the stack using different or additional spacers to compensate for the new die or dies. Other prior design frames permit cutting sleeves to be axially removed through a side of the frame leaving the arbors rigidly positioned in the frame, the arbors, like prior design rolls, are removed from the top of the module.

These removal, installation, and adjustment processes are time consuming resulting in significant down time of the die module. Due to the costly steel frames and associated die rolls, it is cost prohibitive to have extra frames with installed alternate dies to reduce changing and readjusting the modules. Further, prior frames were dedicated to using a particular type of die roll and bearings to support and retain the rolls.

Due to the nature of the prior designs, prior frames were complex in design, expensive to manufacture and assemble and required extensive time to change and readjust the die rolls.

Consequently, it would be desirable to provide a die module improving the problematic conditions in prior rotary die module designs and to provide a module that is inexpensive, facilitates manufacturing, assembling and service, and effectively maintains high precision and quality-cut materials. It would also be desirable to provide a module that is inexpensive to the point that additional frames could be purchased for each die set eliminating the need and associated expenses in changing and adjusting die rolls in a particular frame. It would also be desirable to provide a method of installing and removing dies from a single die frame which was simple and efficient to carry out. It would also be desirable to provide a die module that is relatively easy to move and transport to facilitate flexibility in the placement and integration of the die module in a manufacturing facility.

SUMMARY OF THE INVENTION

The inventive die module or frame includes a base having a plurality of columns removably mounted thereto in spaced relationship to one another. The columns extending from the base define a first axis of movement. The inventive module further includes at least one cross member that moveably engages the columns to position the cross member along the first axis of movement distant from the base. The module includes at least one first modular die support mounted to the base and at least one second modular die support mounted to the cross member each for rolling engagement with at least one rotary cutting die positioned between the base and the cross member. The modular die supports may easily be removed from the frame for replacement by different die supports to accommodate different die rolls for alternate applications.

In a preferred aspect of the invention, the first and second modular die supports include at least two rollers having axes of rotation angularly spaced from one another to rollingly engage the die rolls.

In an alternate aspect of the invention, the first and second modular die supports each include a cylindrical roller bearing. The cylindrical roller bearings rotatably engage journals protruding from the die rolls.

In another preferred aspect of the invention, a first and a second rotary die are positioned in parallel relationship and rolling engagement with one another. The first die includes at least one raised annular flange which engages the first die support and the second die to limit linear translation of the dies along their respective axis of rotation within the frame.

In another preferred aspect of the invention, a pressure member is employed to selectively adjust the position of the cross member and to selectively exert a force on the cross member to preload the die through the frame.

The inventive method for installing a rotary die in a die frame includes positioning a die conveyor adjacent a frame between the base and the cross member which are separated by a plurality of columns defining a first axis of movement. Once the conveyor is positioned, the die is moved along the second axis into the frame. The die is then supported and is moved along the first axis of movement placing the die in operable engagement with the frame. The support and the conveyor are then removed.

In a preferred aspect of the inventive method, a die shuttle is used to move the rotary die along the second axis of movement to the frame. A support strap is attached to the cross member and the die for support of the die for movement of the die along the first axis of movement.

The inventive method for removing a die from a die frame includes supporting the die in the frame and positioning a die conveyor between the base and the cross member. The die is thereafter placed on the conveyor and the die is moved along the second axis of movement away from the frame.

In a preferred aspect of the inventive method to remove the die, the die is moved along the first axis of movement by supporting the die by support straps attached to the cross member whereupon moving the cross member along the first axis of movement translates the die along the first axis.

In a preferred aspect the invention, a die shuttle is used on the conveyor to support and transfer the die along the second axis of movement.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
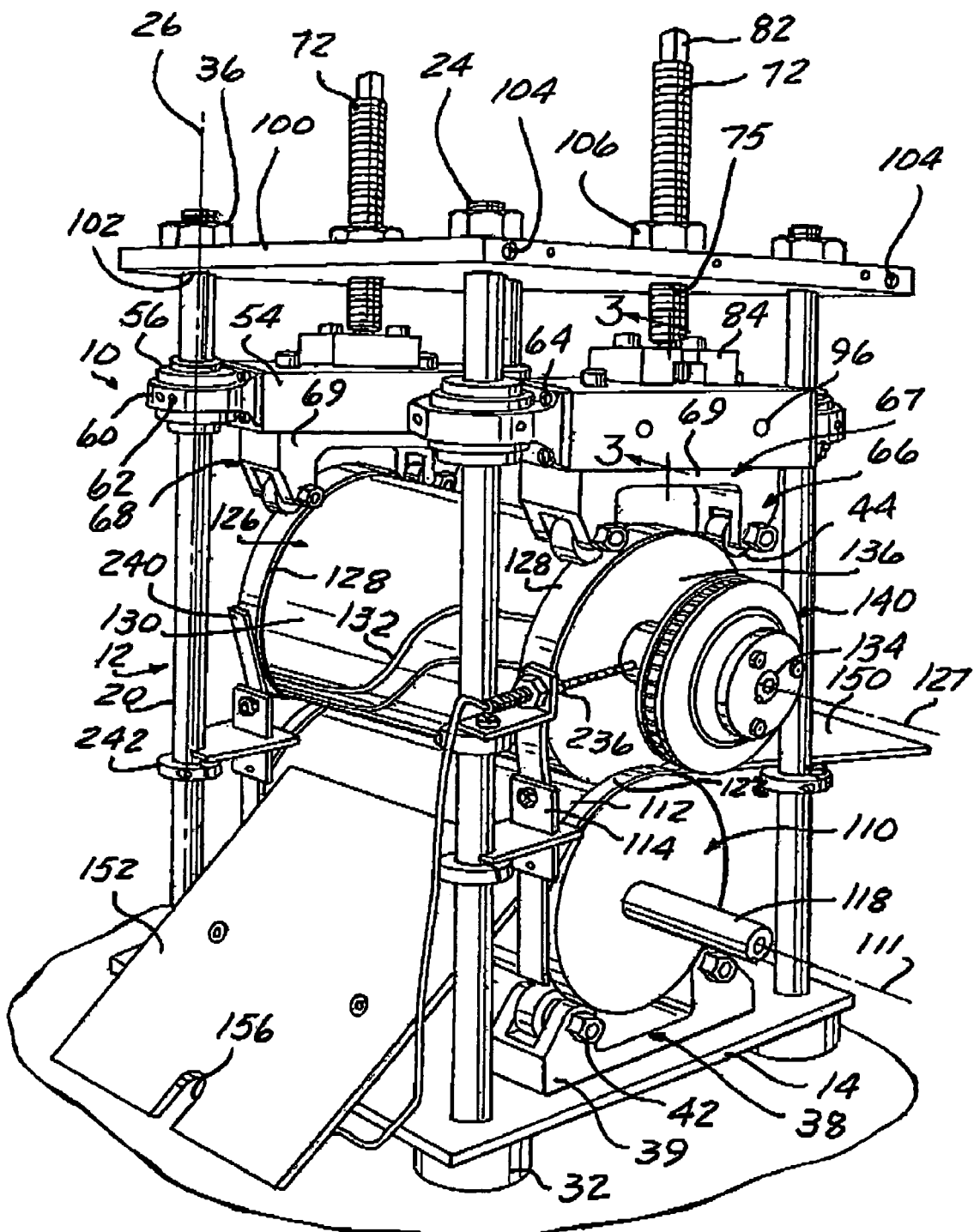
FIG. 1 is a perspective view of the rotary die apparatus with two rotary dies in their operable position.
Figure 2:
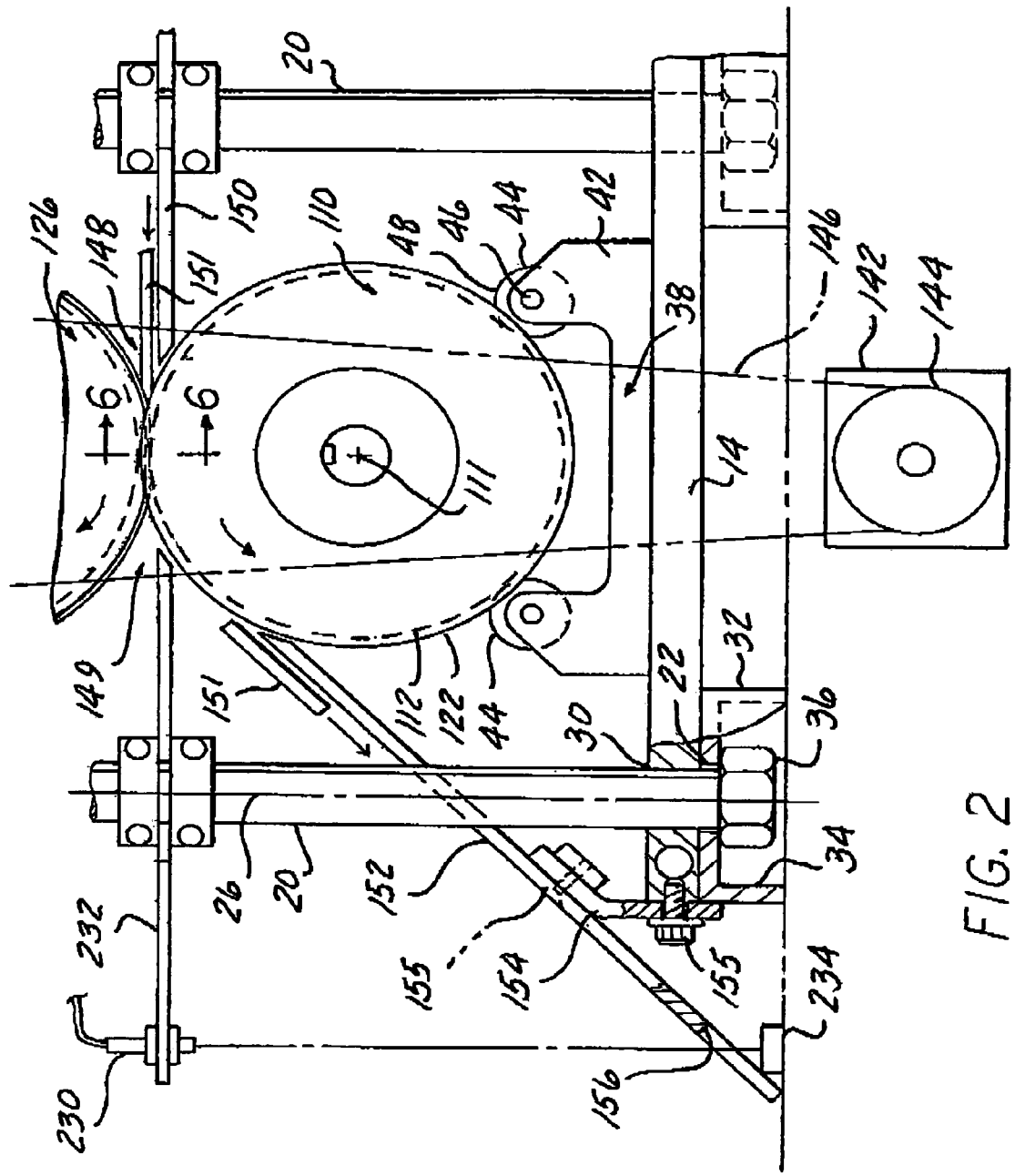
FIG. 2 is a partial side view of the apparatus shown in FIG. 1.

Referring to FIGS. 1 and 2, a rotary die module 10 is illustrated. Die module 10 includes a frame assembly 12 including a base 14, a plurality of columns 20, cross members 54, a first modular die support 38, a second modular die support 66, a first die roll 110, a second die roll 126, and a cover 100.

The base 14 is illustrated as a substantially rigid plate having a generally square shape. Base 14 includes base supports 32 positioned adjacent to the corners of base 14 to elevate frame assembly 12 above a working surface such as a table or floor to facilitate transporting the die module by hand or mechanical means such as a forklift or overhead hoist. Base 14 may consist of a ferrous or non-ferrous material such as steel, aluminum or other materials exhibiting similar strength and rigidity properties. Base supports 32 may be made from a similar material or, if a reduction in vibration is needed, a dampening material such as rubber or an elastomer. Although shown in a generally square shape, base 14 may take any suitable perimeter shape such as a polygonal or circular shape to accommodate the orientation of the columns 20, functionality requirements, or manufacturing location.

FIG. 1 further illustrates four columns 20 positioned substantially at 90 degree angles from one another and are adjacent to the exterior corners and in substantially perpendicular orientation to base plate 14. As shown in FIGS. 1 and 2, columns 20 have a first end 22 and a second end 24. First end 22 and second end 24 define a first axis of movement 26. First end 22 and second end 24 are preferably threaded to accommodate standard threaded fasteners such as nuts. As shown in FIG. 2, columns 20 are removably mounted to the base 14 through passage of columns 20 through bores 30 in the base such that the first ends 22 pass through base 14 and protrude from the underside of base 14. First ends 22 are received by base supports 32 through a recess 34. First ends 22 are removably mounted to base 14 through threading engagement of a common fastener 36 such as a nut.

Figure 12:
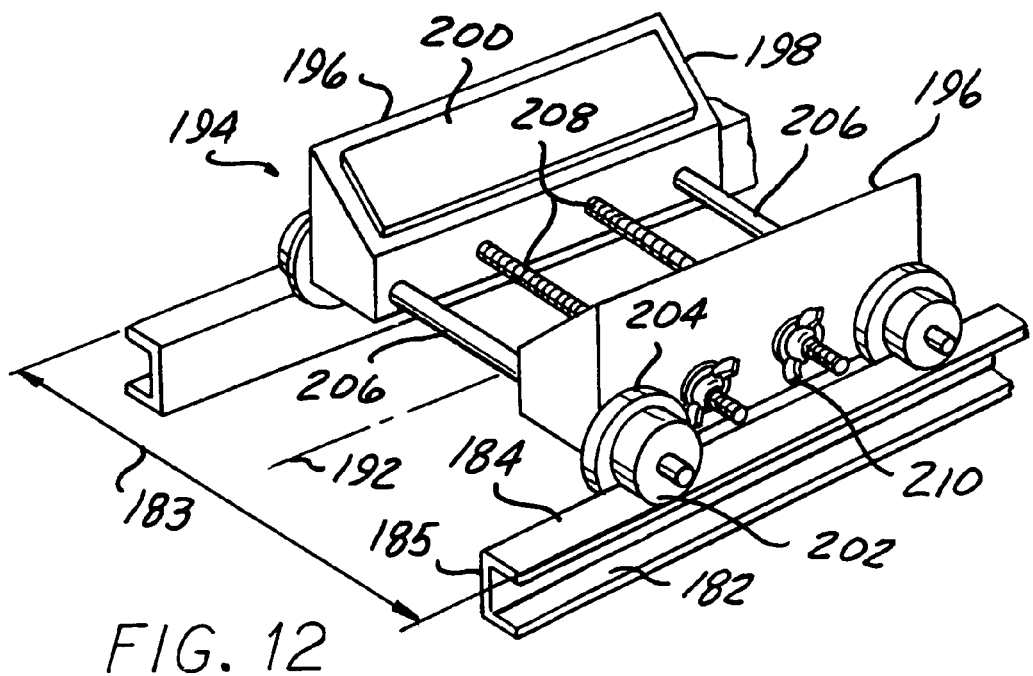
FIG. 12 is an enlarged perspective view of the shuttle shown in FIG. 10.

In a preferred aspect of the invention, the second end 24 of columns 20 is removably mounted to cover 100 as illustrated in FIG. 1. Cover 100 is illustrated as a substantially rigid plate having a generally square shape similar to base 14. In similar fashion to base 14, cover 100 includes four through bores 102 positioned adjacent the exterior corners of cover 100 and are in axially alignment with bores 30 in base 14. To ensure alignment of bores 30 in base 14 and bores 102 in cover 100, cover 100 and base 14 are clamped together in overlapping relation and the respective bores reamed through cover 100 and base 14 together. As seen in FIG. 12, bores 102 further include a channel 103 cut through cover 100 extending to the periphery of cover 100. A fastener 104 is used to narrow channel 103 to apply circumferential pressure around columns 20 to selectively position cover 100 on columns 20. Second ends 24 of column 20 are removably mounted to cover 100 through threading engagement of a common locking fastener 36 such as a nut.

Columns 20 are preferably common, off-the-shelf round, solid steel rods which are cut to the desired length and threaded on first ends 22 and second ends 24 as previously described. Columns 20 may take the form of any polygonal shape and may be manufactured from other substantially rigid materials such as aluminum or reinforced polymers. Although the preferred embodiment shows use of four columns, it is understood that less than four or more than four columns may be utilized depending on the application of die module 10 and functional requirements.

As shown in FIG. 1, die module 10 preferably includes two cross members 54. Cross members 54 are positioned on and between opposing pairs of columns 20. Cross members 54 are movably engaged with the respective columns 20 at opposite ends permitting movement of cross members 54 along the first axis of movement 26. Cross members 54 include a collar 60 on each end of cross member 54 housing a linear, circular bearing 56 surrounding the periphery of column 20 and are in rolling engagement therewith. Collar 60 is removably secured to linear bearing 56 through circumferential pressure exerted by a fastener 62. Collar 60 is mounted to a respective end of cross member 54 through common fasteners 64. Cross members 54 may be made from common, steel rail stock cut to length to receive collars 60. Other shapes and materials such as aluminum or reinforced polymers may also be used.

Although die module 10 is illustrated as preferably including two cross members 54, it is understood that a single cross member 54 may be utilized which spans all four columns 20. It is understood that a single cross member 54 may take the form of a substantially rigid plate that is movably engaged with columns 20 in a similar fashion described above. Other forms of a single cross member 54 may be utilized without departing from the invention.

Figure 3:
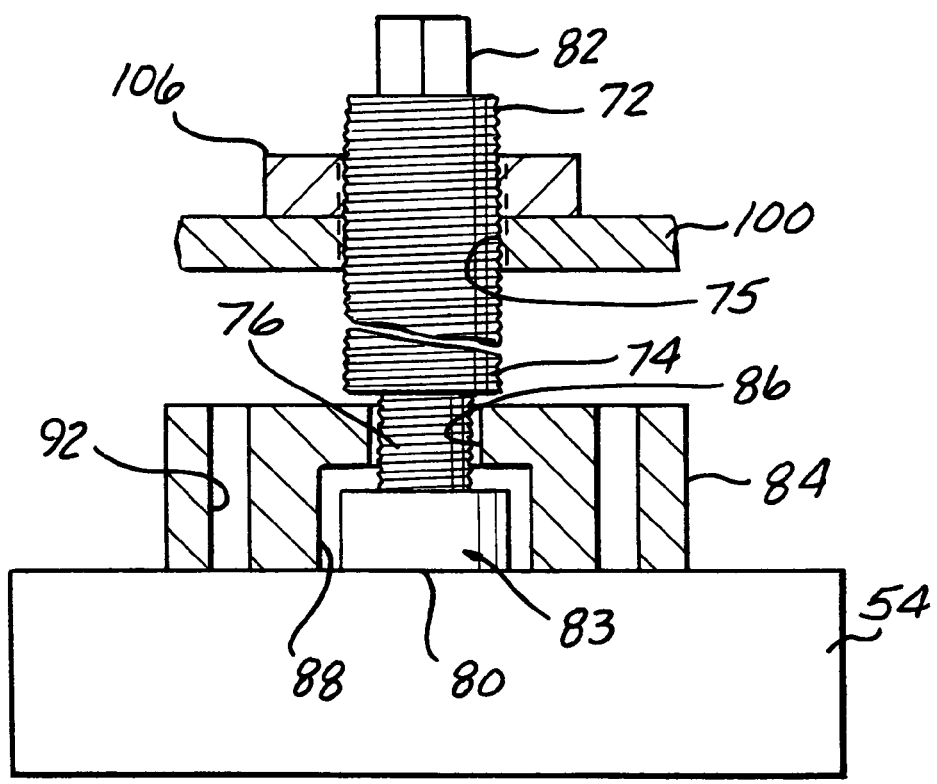
FIG. 3 is a sectional view taken along line 3-3 in FIG. 1.
Figure 4:
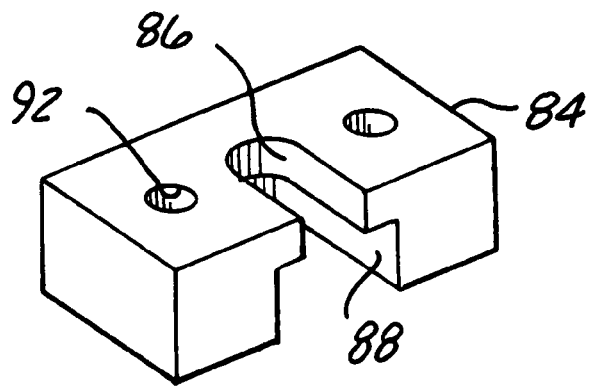
FIG. 4 is a perspective view of a retainer shown in FIGS. 1 and 3.
Figure 5:
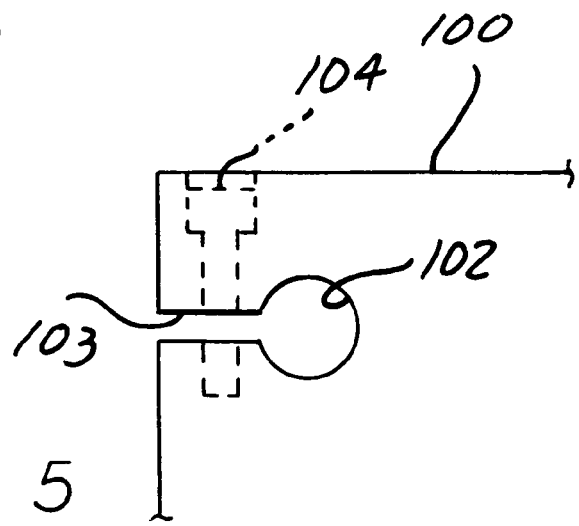
FIG. 5 is a partial top view of the present invention.

As best seen in FIGS. 1, 3, and 4, die module 10 further includes two pressure members for selectably adjusting the position of cross members 54 along the first axis of movement 26. Pressure members 72 further provide means to selectively exert a force to apply downward pressure on a second rotary die 126 against a first die 110 to prevent vertical movement of second die 126 during operation. Pressure member 72 includes a first end 82 and a second end 83. As seen in FIG. 1, each cross member 54 includes a pressure member 72 positioned in substantially parallel alignment with first axis of movement 26. Pressure member 72 is preferably a common, threaded circular steel rod which is threadingly engaged with threaded openings 75 in cover 100. As best seen in FIG. 3, pressure member 72 is operably engaged with cross member 54 at second end 83. Pressure member 72 preferably includes a pressure member retainer 84 which is mounted to cross member 54 through common fasteners 78 in through bores 92. Pressure member 72 includes a narrowed portion 76 adjacent second end 83. Referring to FIGS. 3 and 4, pressure member retainer 84 includes an open slot 86 and channel 88 for operably receiving narrowed portion 76 and second end 83 of pressure member 72.

Pressure member 72 further includes a locking member 106, preferably a threaded nut. As illustrated, first end 82 of pressure member 72 includes a non-threaded, square or hex shaped portion to receive a common, open-ended wrench or socket for ease of rotating pressure member 72 through threaded opening 75 in cover 100. Second end 83 of pressure member 72 further includes a pressure surface 80 in abutting engagement with cross member 54 when pressure member 72 is used to apply pressure to second die 126 in a downward direction toward the base 14.

Although pressure member 72 is illustrated as a circular threaded rod 72, it is understood that other ways for adjusting the position of cross members 54 or ways to apply force and preload the dies may be employed, for example, hydraulic or pneumatic cylinders or a rack and pinion gear assembly. Equally, more than two threaded rods may be used, for example, on a large cover 100 to minimize the span between columns 20. In alternate aspects of the invention, pressure member 72 may be eliminated in favor of a modified collar 60 to securely position cross members 54 on columns 20. Collar 60 and fastener 62 may be used to employ a circumferential clamping force around columns 20 to selectively prevent movement of cross members 54 when cross members 54 are placed in a desired position along first axis of movement 26.

Figure 6:
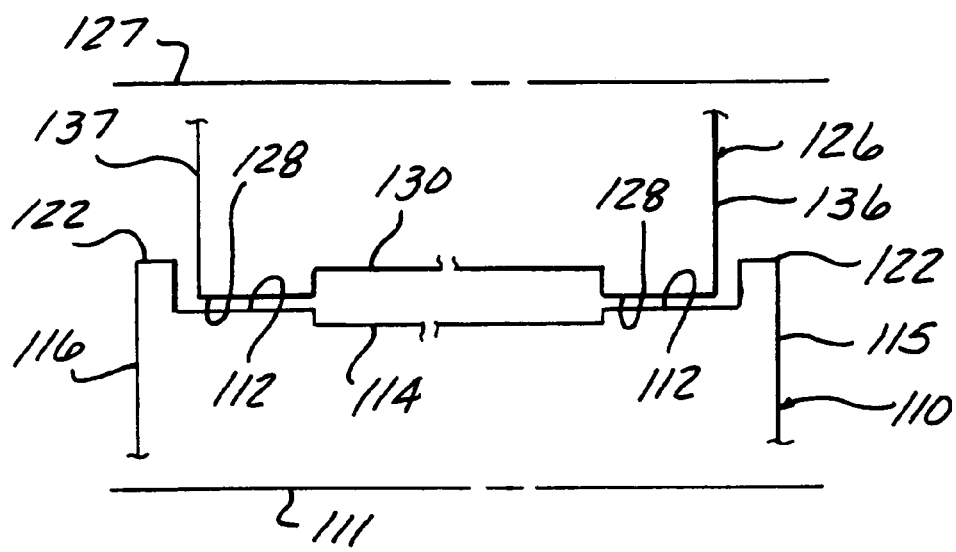
FIG. 6 is a sectional view taken along line 6-6 in FIG. 2.

Referring to FIG. 1, rotary die module 10 is preferably used with a first rotary die or anvil 110 having a first axis of rotation 111 and a second rotary die 126 having a second axis of rotation 127. Referring to FIGS. 1 and 6, first die 110 further includes a first end 115 and an opposing second end 116. Second die 126 includes a first end 136 and a second end 137.

As best seen in FIGS. 1 and 6, in a preferred embodiment and preferred method of operation, first die 110 and second die 126 include bearing surfaces 112 and 128, respectively. First die 110 and second die 126 further include a die surface 130, FIG. 1 showing cutting blades 132 on second die 126. It is understood dies 110 and 126 may both have cutting blades or other material deforming features. In a preferred aspect, first die 110 and second die 126 each include a journal 118 extending outward from first ends 115 and 136 along the first axis 111 and second 127 axes of rotation, respectively. As best seen in FIGS. 1 and 6, first die 110 and second die 126 are positioned within frame 12 having the first axis 111 and second axis 127 of rotation in substantially parallel alignment. In this mode of operation, first die 110 and second die 126 are placed in rolling engagement with one another along bearing surfaces 112 and 128.

In a preferred aspect, first die 110 further includes a raised radial flange 122 adjacent first 115 and second end 116. As illustrated, second die 126 is narrower in width such that first 136 and second 137 ends lie within flanges 122 to limit or prevent any significant linear movement of die 126 along the second axis of rotation 127. This limitation in linear movement along the second axis of rotation eliminates the need for traditional bearing blocks in relatively low speed applications to prevent such linear movement. Although flanges 122 are illustrated on first die 110, flanges 122 could alternately be on second die 126.

Referring to FIGS. 1 and 2, second die 126 includes a drive gear mounted to journal 118 which is frictionally engaged to a drive motor 142 with a belt 146 as best seen in FIG. 2. As illustrated in FIGS. 1, 2 and 6, second die 126 driven by motor 142 is in rolling engagement with first die 110. It is understood that other methods of driving first die 110 or second die 126 may be accomplished in many ways without deviating from the present invention. For example, as shown in FIG. 10 complimentary drive gears may be used on journals 118 of both dies to engage one another or other type of belt or chain drive to power one or both of the dies simultaneously.

Figure 10:
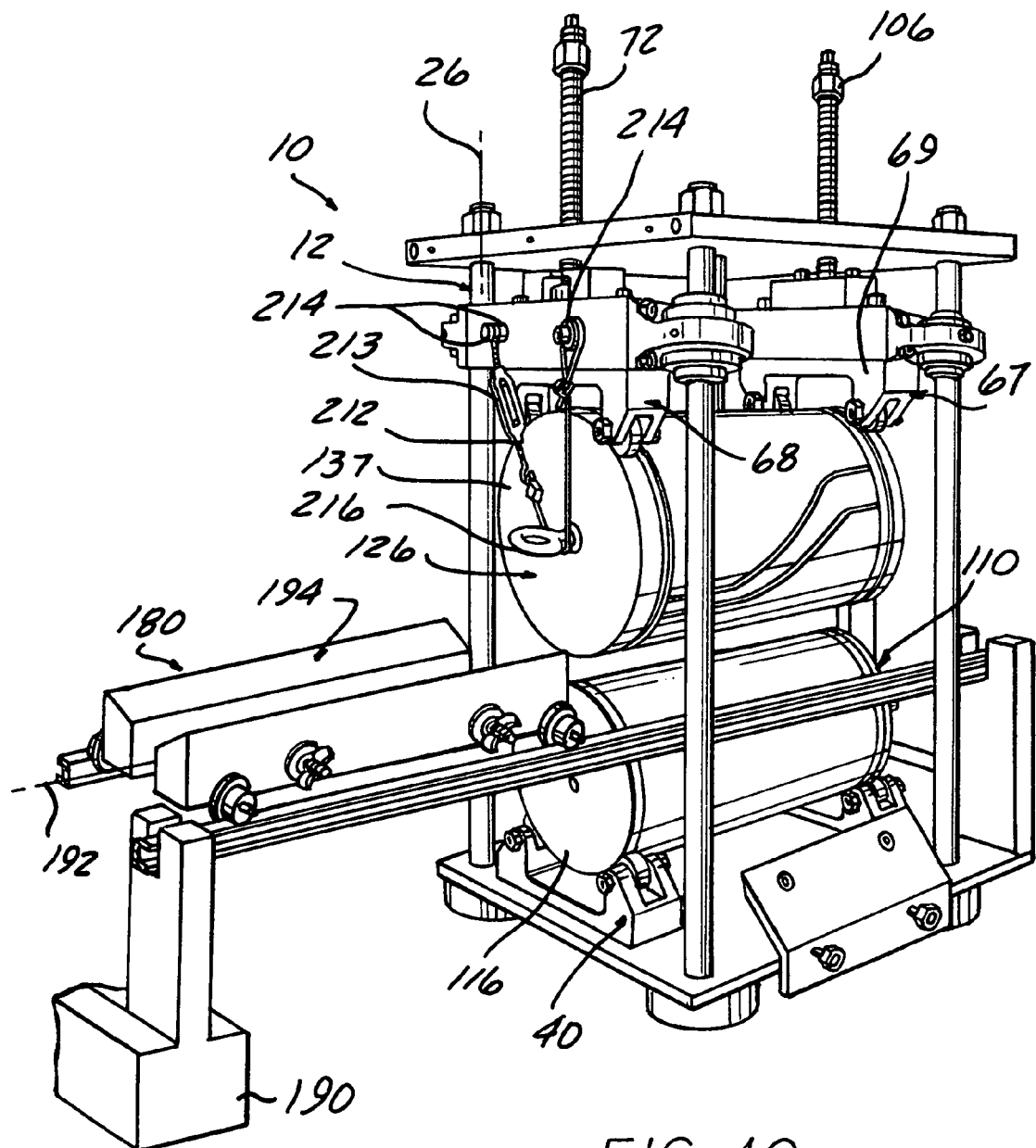
FIG. 10 is a perspective view of the inventive method showing two rotary dies.

Referring to FIGS. 1, 2 and 10, die module 10 further includes a first modular die support 38 and second modular die support 66 which rollingly engage first die 110 and second die 126 respectively. In a preferred aspect of the invention, first modular die support 38 includes a first bearing 39 and a second bearing 40 separated from one another along first axis of rotation 111. As illustrated, first modular die support 38 and second modular die support 66 include a bearing supports 42 and 69 respectively, each having two bearing rollers 44 spaced angularly apart from one another about the first 111 and second 127 axes of rotation respectively. Bearing supports 42 and 69 are removably mounted to base 14 and cross member 54 respectively and may be manufactured from ferrous of non-ferrous metals including steel or aluminum and formed to accommodate rollers 44 and a pin (not shown) around which rollers 44 rotate. Each roller 44 includes an axis of rotation 46 substantially in parallel alignment with first 111 and second 126 axes of rotation of the first 110 and second 126 rotary dies respectively. Each bearing roller 44 includes a bearing surface 48.

Referring to FIGS. 1 and 10, in a preferred aspect of the invention, the first 39 and second 40 bearings of first modular die support 38 are removably mounted to base 14 having one roller 44 of each bearing on either side of the first axis of rotation 111 of first die 110. Such placement permits larger and smaller diameter dies without having to reposition the first modular die supports. This equally applies to the second modular die support 66 permitting alternate diameter second dies 126. Bearing support 42 is removably mounted to a base 14 using common fasteners (not shown). First 39 and second 40 bearings are positioned along the first axis of rotation 111 such that roller surfaces 48 rollingly engage the bearing surfaces 112 of first die 110. Rollers 44 are positioned on base 14 such that rollers 44 rollingly and abuttingly engage raised flanges 122 limiting any significant linear movement of first die 110 along the first axis of rotation 111.

Referring to FIGS. 1 and 10, in a preferred aspect of the invention, second modular die support 66 includes a first 67 and a second 68 bearing similar to that described for first modular die support 38. The first 67 and second bearings 68 are removably mounted on cross members 54 as illustrated. In similar fashion to first modular die support 38, first 67 and second 68 bearings include a bearing support member 69 and bearing rollers 44 spaced angularly apart from the second axis of rotation 127 of the second die 126. Bearing rollers 44 of second modular die support 66 rollingly engage bearing surfaces 128 of the second die 126.

Although cross members 54 are shown positioned on columns 20 transverse to the first 111 and second 127 axes of rotation, it is understood that cross members 54 may be positioned in parallel to the axes of rotation and include rollers 44 adjacent the ends engaged with the columns 20.

Figure 8:
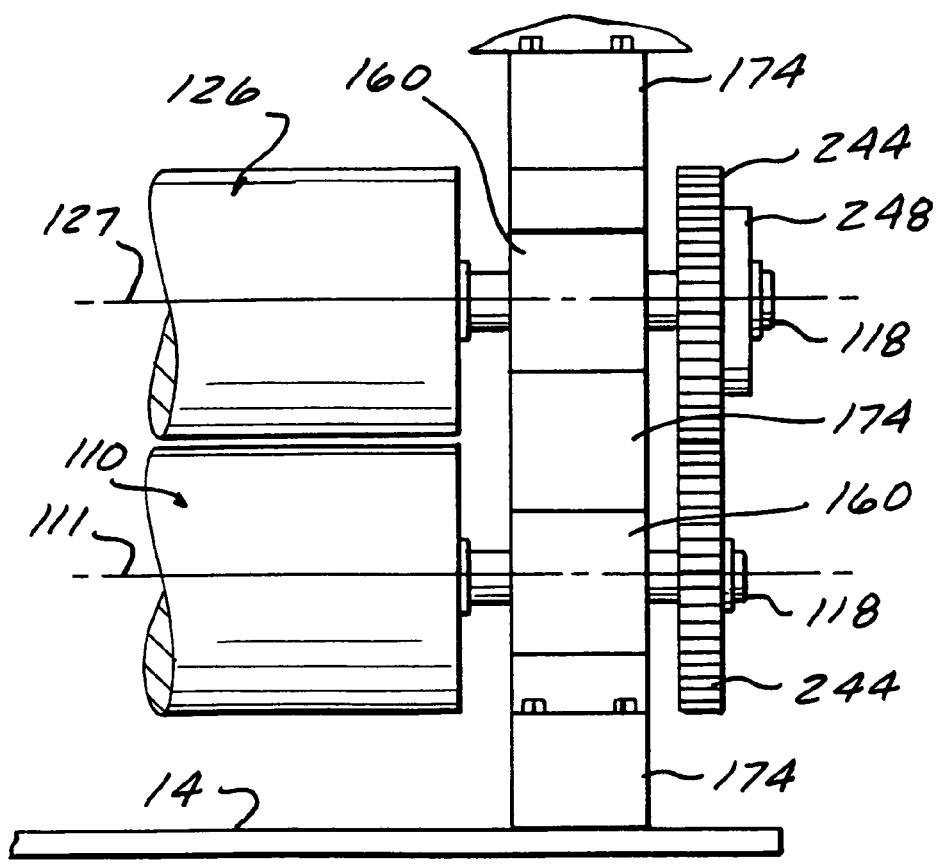
FIG. 8 is a partial side view of FIG. 7.
Figure 7:
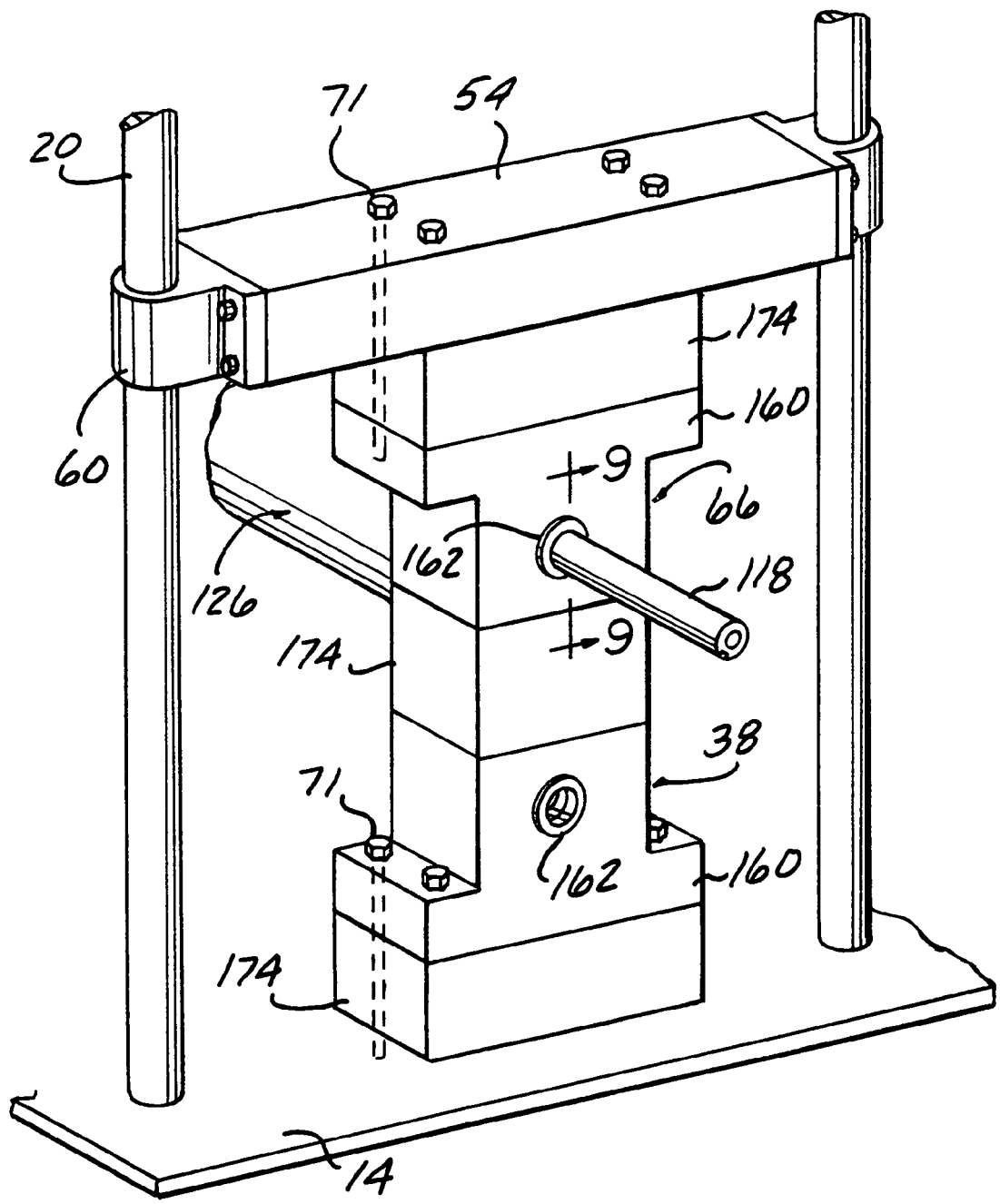
FIG. 7 is a partial perspective view of an alternate embodiment of FIG. 1.
Figure 9:
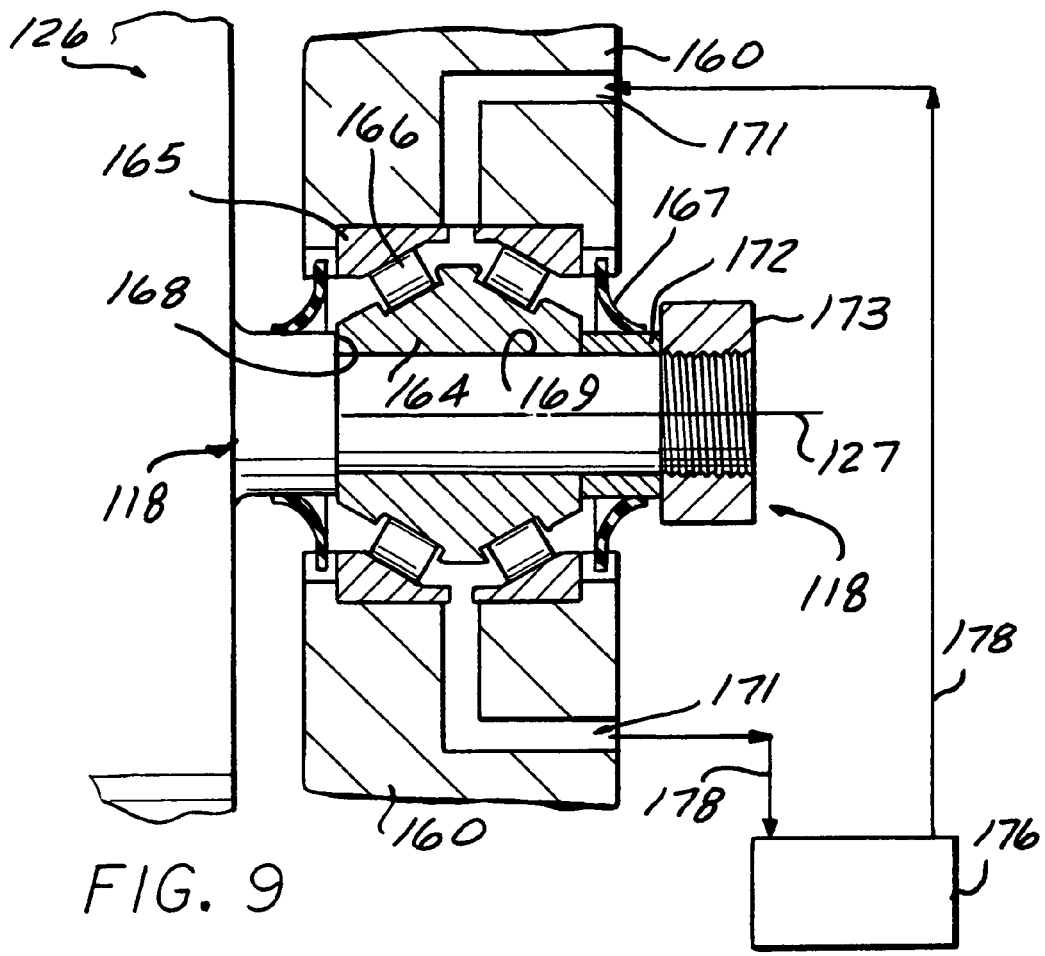
FIG. 9 is a sectional view taken along line 9-9 in FIG. 7.

In an alternate aspect of the invention, as best seen in FIGS. 7, 8 and 9, first 38 and second 66 modular die supports utilize a bearing block 160 which sealingly houses a cylindrical roller bearing 162. Cylindrical bearings 162 are positioned along the first 111 and second 127 axis of rotation of first die 110 and second die 126, respectively. In this aspect, first 110 and second 126 dies include a journal 118 extending from each end of the respective die roll and rollingly engage a bearing block 160 as described and illustrated in FIG. 7. As the first 38 and second 66 die supports are modular in design, combinations of bearing blocks 160 and bearings 39, 40, 67 and 68 including rollers 44 may be used to best meet the particular dies in use, the material to be processed, and the speed of the material feed to optimize usage of the rotary die module 10. As described and illustrated, frame 12 can be used with the different modular die supports to meet the requirements of the application.

As best seen in FIG. 9, cylindrical bearing 162 includes an inner race 164 and an outer race 165 encapsulating roller bearings 166. Inner race 164 is in operable engagement with a bearing surface 169 of journal 118. Bearing block 160 is slidingly engaged with journal 118 and abutting engagement with a shoulder 168 on journal 118. Bearing block 160 is prevented from linear movement along second axis of rotation 127 through threading engagement of a fastener 173, such as a locking nut, and ring 172 while allowing free rotation of die 126 about axis 127.

Referring to FIG. 7, depending on the application and required position of the first 110 and second 126 dies, spacers 174 may be used to adjust the position of the first 111 and second 127 axis of rotation of first 110 and second 126 dies, respectively. As illustrated in FIG. 7, first 38 and second 66 modular die supports are removably mounted to base 14 and cross member 54 through common fasteners 71 through spacers 174 and bearing blocks 160. As illustrated, a spacer 174 is inserted between bearing blocks 160 of the first 110 and second 126 dies. Upon lowering of cross members 54 and application of pressure members 72, a force or preload is exerted by the second die 126 bearing blocks 160 to the first die 110 and base 14. Spacers 174 are mounted to bearing blocks 160 through removable pins in the spacers 174 and, bearing blocks 60 (not shown).

In preparing the alternate embodiment for operation, cross members 54 are adjustably positioned along first axis of movement 26 to apply pressure to preload the bearing blocks 160 and spacers 174 to prevent movement of the axes of rotation along the first axis of movement 26. Referring to FIG. 10 in the alternate embodiment, or particularly where both first 110 and second 126 dies include cutting blades 132 or other material altering features, gears 244 mounted to journals 118 engage one another to synchronize rotation of the dies. In this embodiment, a phase adjust and anti backlash device 248 may be used to adjust engagement of gears 244 for proper alignment as understood by those skilled in the art. It is understood that the preferred embodiment, utilizing bearing rollers 44 in rolling engagement of dies 110 and 126 are particularly useful for low-speed applications less than six hundred (600) linear material feet per minute. It is understood that first 38 and second 66 modular die supports utilizing cylindrical bearings or combinations of cylindrical bearings 162 and rollers 44 are particularly useful for medium and high speed cutting applications exceeding six hundred (600) linear material feet per minute.

Referring to FIG. 9, it is further contemplated that at medium and high cutting speeds, utilizing the alternate bearing block 160 and cylindrical bearings 162 embodiment of modular die supports, a cooling liquid recirculation device 176 may be employed to reduce thermal temperatures of cylindrical bearings 162 bearing blocks 160, journals 118, die surfaces and surrounding components. An exemplary cooing device includes a recirculating device 176 which pumps a cooling fluid (not shown) through hoses 178 into and out of cylindrical bearings 162 having seals 167 to transfer heat away from the points of friction.

Referring to FIG. 2, in a preferred aspect of the invention, die module 10 includes an in-feed 148 for material 151 to enter the dies and a discharge 149 where cut material 151 exits the dies. Material 151 is supported by an in-feed member 150 mounted to columns 20 prior to entering in-feed point 148. Cut material 151 is supported by a discharge member 152 upon exiting the cutting dies. As best seen in FIG. 2, discharge member 152 is mounted to base 14 through a mounting bracket 154 mounted to discharge member 152 and base member 14 through common fasteners 155. Material 151 enters and exits frame 12 through openings in a guard surrounding frame 10 (not shown).

Die module 10 further includes an optical sensor 230 mounted to columns 20 by extension bracket 232. As best seen in FIGS. 1 and 2, optical sensor 230 is positioned in alignment with an opening 156 in discharge member 154 and an optical reflector 234. Optical sensor 230 may be used in many applications, for example, maintaining a count of cut materials 151, or use with a proximity switch 236 to start or stop the dies on preselected parameters. Referring to FIG. 1, wiping pads 240 are used to continually clean and remove debris or other undesirable build up on the critical dies bearing surfaces 112 and 128. Wiping pads 240 are attached to discharge member 154 through holder 242.

Figure 11:
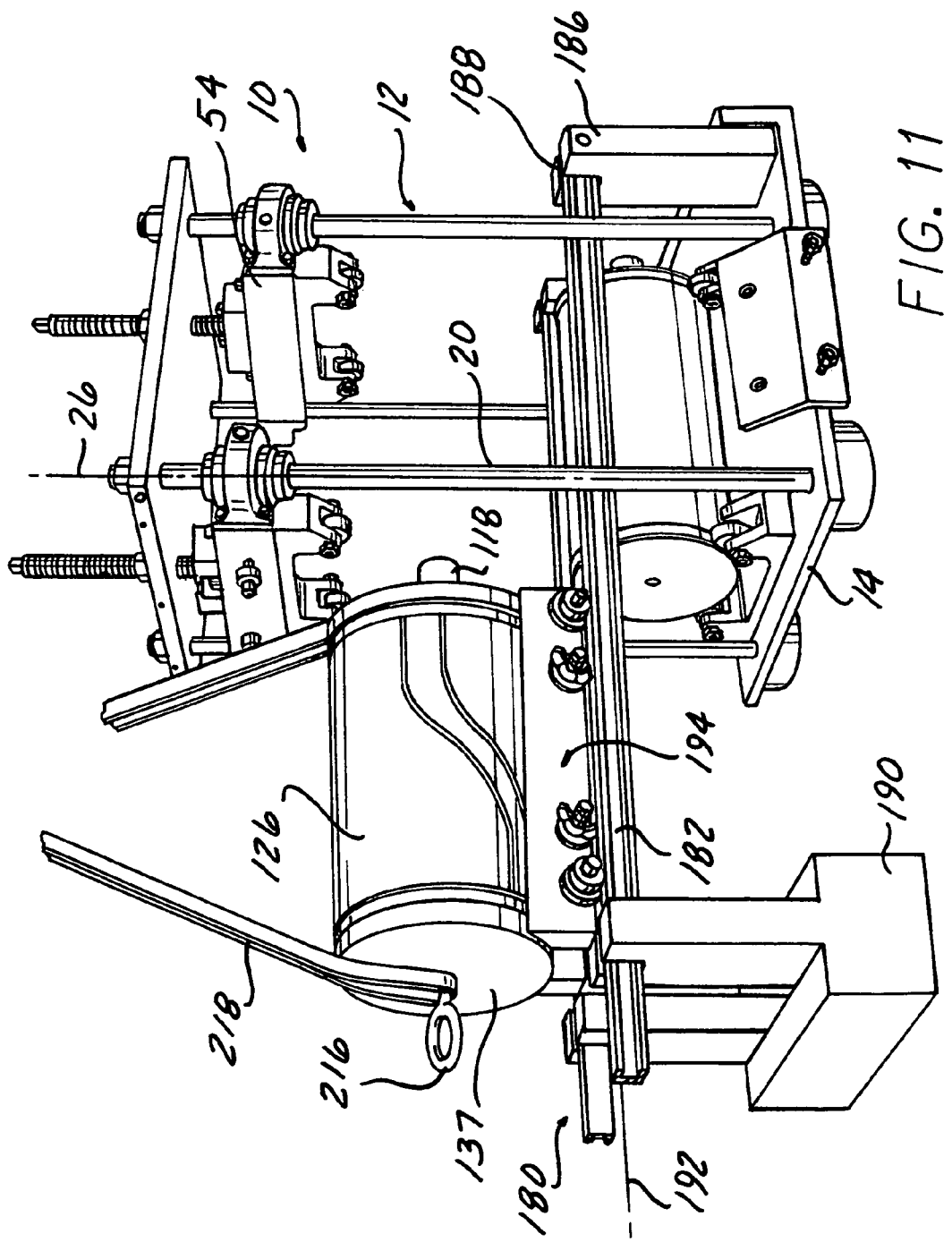
FIG. 11 is a perspective view of FIG. 10.

Referring to FIGS. 10, 11, and 12, a preferred method for installing and removing rotary cutting dies in a die module 10 is illustrated. A die module 10 having a frame 12, cross members 54, first 38 and second 66 modular die supports, and first rotary die 110 and second rotary die 126 is illustrated. As best seen in FIG. 11, in a preferred method of the invention, a die conveyor 180 is used to support and transport rotary dies to and from the die module 10 along a second axis of movement 192.

Referring to FIGS. 11 and 12, die conveyor 180 includes two rails 182 supported by a first rail support 186 and a second rail support 190. Rail supports 186 and 190 include a stop 188 to prevent further translation along the second axis of movement 192. Rails 182 are positioned in a substantially horizontal plane and are spaced from one another at a width 183 which is less than the distance between columns 20 but wider than the diameter of first die 110 as best seen in FIG. 11. Die conveyor 180 further includes a die shuttle 194 which rollingly engages rails 182 and is used to support or cradle the rotary dies for transport. As best seen in FIG. 12, die shuttle 194 includes two opposing holder blocks 196 having opposed angled surfaces 198. Holder blocks 196 further include a contact pad 200 mounted to angled surface 196 to cushion and protect the bearing surfaces 112 and 128 and die surfaces 114 and 130 of first die 110 and second die 126, respectively. Pad 200 may be made from a soft or compressible material, for example, rubber or high density foam.

Die shuttle 194 further includes rollers 202 which are attached to axles 206 of the die shuttle and rollingly engage rails 182 along an upper rail surface 184 as shown in FIG. 12. Rollers 202 further include a raised flange 204 which slidingly engage a rail inner surface 185 to prevent die shuttle 194 from unauthorized translation to the exterior of the rails 182. Die shuttle 194 further includes an adjustment member 208 for selectively establishing a preferred distance between holder blocks 196 through fasteners 210. Die shuttle 194, using adjustment member 208 is selectively adjusted to adequately support different diameter rotary dies, particularly different diameter second dies 126 which, when used with a first die 110 having no cutting blades, can easily be changed with the inventive die module 10 as further described below.

Referring to FIG. 10 the inventive methods further include anchors 214 threadingly engaged in each cross member 54 and a stud 216 threadingly engaged in a threaded opening (not shown) in second end surface 137 of second die 126. A second stud 216 (not shown) may be threadingly engaged in second surface 116 of first die 110 for installation and removal of die 110 (not shown).

The inventive methods preferably include a support strap 212 having a length and opposing ends 216 removably mounted to anchors 214. Support strap 212 further includes a tensioning member 213 for adjusting the tension and length of support strap 212 on operable engagement with stud 216. In a preferred aspect of the inventive methods, a strap 212 is removably mounted to each cross member 54 and is operably engageable with journal 118 on first end 136 of second die 126 (not shown) in a similar manner excluding stud 216. Although support strap 212 is preferably a cable having a turn buckle and a hook and eye on ends 216, other straps, tensioning members and ends may be used such as webbing, ratcheting buckles, and clevis and pin arrangements without departing from the invention.

Although two support straps 212 have been described and illustrated, one on each cross member 54 for each end of second die 126, it is understood that a single support strap, such as sling (not shown), could be used in conjunction with cross members 54 or a single cross member 54, to engage second die 126, for example, a wide webbing which operably engages die surface 130.

As best seen in FIG. 11, in a preferred aspect of the inventive method for installing a rotary die, for example, second die 126, in a rotary die module 10, die conveyor 180 is positioned in die frame 10 by positioning first rail support 186 and rails 182 inbetween and through columns 20 whereby the second axis of movement 192 intersects first axis of movement 26. Once positioned, cross members 54 are moved away from base 14 along the first axis of movement 26 by pressure members 72 to provide clearance for passage of die 126 into frame 10.

Once die conveyor 180 is positioned as described, second die 126 is lowered and positioned on die shuttle 194 through manual means or by an overhead hoist and transport strap 218 engaged with journal 118 and stud 216 mounted to die 126. Transport strap 218 is then removed.

Second die 126 is moved along the second axis of movement 192 and positioned in frame 10 between columns 20 and adjacent to first die 110 as best seen in FIG. 10. On positioning die 126 in frame 12, cross members 54 are preferably moved along first axis of movement 26 to contact die 126 and place rollers 44 in rolling engagement with bearing surfaces 128 as best seen in FIG. 6. A support strap 212 is then attached to anchors 214 on each cross member 54, the straps 212 engaging stud 216 and journal 118. Tensioning member 213 of each support strap 212 is adjusted to decrease the length of the strap to remove any slack.

Second die 126 is moved along the first axis of movement 26 toward cover 100 to disengage second die 126 from die shuttle 194. In a preferred aspect, movement of die 126 along the first axis of movement 26 occurs by movement of cross members 54 through adjustment of pressure members 72. Referring to FIGS. 1 and 10, locking members 106 are loosened or threading in an upward direction on pressure member 72 distant from cover 100. Pressure members 72 are then threaded in a counterclockwise or upward direction thereby moving cross members 54 along first axis of movement 26 away from base 14. In an alternate aspect, cross members 54 may remain stationary and movement of die 126 along the first axis of movement 26 may be accomplished by decreasing the length of strap 212 through adjustment of tension member 213. The alternate aspect would take place prior to lowering cross members 54 into contact with die 126 as previously described.

On supporting and raising second die 126, die shuttle 194 is moved along the second axis of movement 192 away from frame 10. Die conveyor 180 is then removed from frame 12.

As illustrated in FIG. 10, the first die 110 or anvil already being in operable position in frame 12, second die 126 is moved along first axis of movement 26 toward base 14 for contact and rolling engagement of bearing surfaces 128 and 112 of second die 126 and first die 110 respectively. As best seen in FIGS. 1 and 6, in a preferred aspect, second die 126 is operably positioned between raised flanges 122 of first die 110.

In another alternate aspect, an overhead hoist and transport strap 218 may be used to move die 126 along the first axis of movement 26 to disengage die 126 from shuttle 194 without use of support straps 212. In this alternate aspect, die 126 is positioned in frame 12 and transport strap 218 is placed outside of cover 100 and the operative ends are engaged with journal 118 and stud 216. An overhead hoist is used to tension the transport strap 218 and lift die 126 off shuttle 194.

Although illustrated and described as installing second die 126 in module 10, it is understood a similar procedure may be employed to install first die 110 in frame 12 in operable engagement with rollers 44 of first modular die support 38 as shown in FIGS. 1 and 10.

FIGS. 1, 10, 11 and 12, illustrate a preferred method of removing a rotary die from a die frame 12. In an operable position as shown in FIG. 1, second die 126 is in rolling engagement with first die 110. To remove for the purpose of changing one or both of the rotary dies, a support strap 212 is secured to anchors 214 and engaged with journal 118 and stud 216 as previously described in the method of installing the second die 126. Tensioning member 213 is used to decrease the length of strap 212 to remove any slack and maintain contact between bearing surface 218 and second die support 66 rollers 44.

Second die 126 is supported by straps 212 and moved along first axis of movement 26 away from base 14 to disengage second die 126 from first die 110 as best seen in FIG. 10. As described in the inventive method, movement of second die 126 along first axis 26 is preferably accomplished by moving cross members 54 along first axis 26 through adjustment of pressure members 72. Alternately, the cross members 54 could be raised and second die could be raised through tensioning members 213 or an overhead hoist and a transport strap 218 as previously described.

Second die 126 is moved away from first die 110 along first axis of movement 26 to provide sufficient clearance for die conveyor 180 to be positioned in frame 10 to intersect the first axis of movement 26 as best seen in FIGS. 10 and 11. Die shuttle 194 is moved along the second axis of movement 192 to the frame 10 in a position intersecting first axis movement 26 adjacent supported second die 126. Second die 126 is moved along the first axis 26 to engage die shuttle 194 to support die 126. Support straps 212 are lengthened through tension member 213 and disengaged from stud 216 and journal 118.

In a preferred aspect, cross members 54 are moved along first axis 26 through pressure members 72 away from base 14 to disengage second bearing 66 rollers 44 from die 126 providing adequate clearance to remove second die 126 to avoid further contact of second modular die support 66 rollers 44 with die 126.

Second die 126 is then removed from frame 12 by shuttle 194 along the second axis of movement 192. Maintenance or adjustment of dies 110, 126 or frame 12 can be carried out or an alternate die may be installed as described by the inventive method for installation. Although removal of the second die 126 is illustrated and described, it is understood that a similar method may be used to remove first die 110. In removing first die 110, conveyor rails 180 are positioned such that rail width 183 is greater than the diameter of first die 110 such that conveyor 180 can be positioned in frame 12 while first die 110 is in operable engagement with first modular die support 38.

Although the inventive installation and removal methods are described and illustrated with respect to the preferred, lower speed apparatus, the inventive methods are equally usable with the alternate, medium and high speed frame 12 configuration employing bearing blocks 160 and cylindrical bearings 162 as shown in FIG. 7. On installation, for example, of a second die 126, the first die 110 in operable engagement with first module die support 38, spacers 174 are removably mounted to cross members 54. With cross members 54 positioned along first axis of movement 26 for clearance, second die 126 is moved along the second axis of movement 192 by shuttle 194 as previously described. Referring to FIGS. 7, 9 and 11, once second die 126 is positioned in frame 12, bearing blocks 160 are positioned and mounted on journals 118 through ring 172 and locking nut 173. It is understood that bearing blocks 160 and spacers 174 may be installed on journals 118 prior to moving the second die 126 into frame 12.

Preferably, cross members 54 are moved toward base 14 through pressure members 72 to contact bearing blocks 160 on second die 126. Preferably, bearing blocks 160 are removably mounted to cross members 54 through fasteners 71 shown in FIG. 7. Cross members 54 are moved along the first axis 26 away from base 14 and conveyor 180 is removed from frame 12. Alternately, as illustrated in FIG. 10, support straps 212 or, alternatively, transport strap 218 and a hoist are used to support and lift second die 126 from shuttle 194 to contact cross members 54. Bearing blocks 160 are then removably mounted to cross members 54 through fasteners 71 as previously described. Die conveyor 180 is then removed from frame 12.

As illustrated in FIG. 7, a spacer 174 is positioned and removably mounted on the installed first modular die support 38 on top of bearing block 160 to properly position first die 110 and second die 126 from one another. Second die 126 is moved along first axis of movement 26 to engage spacer 174 through pressure member 72 as previously described. Pins (not shown) are used to engage spacer 174 to bearing blocks 160 of first 38 and second 66 modular die supports.

A method for removing for example, second die 126, from the alternate, medium and high speed rotary die apparatus is described. Preferably, second die 126 is supported and moved along the first axis of rotation 126 by pressure members 72 to separate bearing block 160 of the second modular die support 66 from spacer 174 so that spacer 174 between the first 38 and second 66 modular die supports can be removed and clearance for die conveyor 180 and shuttle 194 to be positioned in frame 12 as previously described. Second die is supported and moved along first axis 26 to position die 126 on shuttle 194. Fasteners 71 are removed disengaging bearing block 160 of second modular die support 66 from cross member 54. Alternately, support straps 212 or transfer strap 218 may be used to support second die 126 while fasteners 71 are removed and straps 212 or 218 are used to lower second die 126 onto shuttle 194.

Second die 126 is then moved along the second axis of movement 192 as previously described. Although described and illustrated as installing and removing second die 126, the inventive methods are equally applicable to installing and removing first die 110.

Referring to FIGS. 1 and 2, in operation, the inventive rotary die module 10 supports and retains a first 110 and a second 126 rotary die used to cut or deform relatively thin, flexible materials at low, medium and high speeds. Using the inventive method of installing the rotary dies, frame 12 supports and maintains first die 110 through rolling engagement of two rollers 44 with bearing surfaces 112 and in rolling, abutting engagement with radial flanges 122. First modular die support 38 allows free rotational movement of first die 110 about first rotational axis 111 while preventing translation of die 110 along first axis of rotation 111.

Columns 20 provide rigid support of a cover 100 distant from base 14 and define a first axis of movement 26. Cross members 54 are movingly engaged on opposing columns 20 and are selectively adjustable along first axis 26 through pressure members 72. On installing a second die 126 in frame 12 through the inventive installation method, second die 126 is placed in engagement with second modular die support 66 placing rollers 44 in rolling engagement with bearing surface 128 on second die 126. Moving second die 126 along first axis 26 as described in the inventive installation method, second die 126 is preferably placed in rolling engagement with first die 110 through rolling engagement of bearing surfaces 128 and 112. Through rolling engagement of second die 126 with rollers 44 and first die 110, second die 126 is freely rotatable about a second axis of rotation 127 while prevented from significant linear translation along second axis 127 by radial flanges 122 of first die 110. Pressure members 72 further provide for exerting a force to preload second die 126 through frame 12 to prevent upward movement of die 126 along first axis 26 during operation.

Through mounting of a drive gear 140 on journal 118 of second die 126, a drive motor 142 rotates second die 126 and through rolling engagement, first die 110. Through employment of an infeed member 150 and discharge member 154, material 151 is automatically or manually fed into the dies at an infeed point 148 placing material 151 in the path of cutting blades 132 on die surface 130 of second die 126 thereby cutting or altering the surfaces of material 151. Processed material 151 is discharged from the rotary dies at 149 and translates down to discharge member 154 to exit the frame 10. An optical sensor 230 and reflector 234 record and process selective parameters to monitor or control the rotary die manufacturing process.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An improved rotary die apparatus having a first rotary die with a first axis of rotation and a second rotary die with a second axis of rotation, the second axis of rotation parallel to the first axis of rotation, the apparatus having a frame including a base, a cover opposite the base, a pair of opposing cross members positioned transverse to the first and second axis of rotation, the cross members moveable between the base and the cover, and a pressure member operably engaged with the cover and the cross members, the improvement comprising:

the frame having a low speed mode of operation below 600 linear feet per minute, the frame further including:
four elongate columns, each column having a first end and a second end, the first end of each column mounted to the base such that the columns are positioned parallel and spaced from one another, and the second end of each column mounted to the cover, each column defining a vertically extending length, the columns having a uniform cross section along the length between the base and the cover;

a die support operably engagable with tile frame, the die support for low speed mode of operation consisting of a first modular die support and a second modular die support, the first modular die support having a first bearing and a second bearing positioned spaced from one another with respect to the first axis of rotation, each bearing mounted directly on the base in a location spaced from the columns, each bearing having at least two rollers, each roller having an axis of rotation substantially parallel to one another and angularly spaced from one another with respect to the first axis of rotation, the rollers in rolling engagement and maintaining the first rotary die in a stationary rotary position upwardly, horizontally transverse to the first axis of rotation and longitudinally along the first axis of rotation with respect to the base, the rollers in operable axial engagement with a raised radial flange on each of a first and a second end of the first rotary die to limit linear translation of the first rotary die along the first axis of rotation, and the second modular die support having a first bearing and a second bearing positioned spaced from one another with respect to the second axis of rotation, each bearing mounted to one or the cross members spaced from the columns in rolling engagement with the second rotary die wherein the second die further comprises a first end and an opposite second end positioned axially inward of the raised radial flanges, each of the first and the second ends operably axially engagable with the adjacent radial flange of the first die to limit linear translation of the second die along the second axis of rotation.

2. The apparatus of claim 1 wherein the first and second bearing of the second modular die support comprise at least two rollers, each roller having an axis of rotation substantially parallel to one another and angularly spaced from one another with respect to the second axis of rotation, the first and the second bearings in rolling engagement with and maintaining the second rotary die in a stationary rotary position in a horizontal direction transverse to the second axis of rotation.

3. A modular rotary die apparatus having a first rotary with a first axis of rotation and a second rotary die with a second axis of rotation parallel to the first axis of rotation comprising:

a frame having a low speed mode of operation below 600 linear feet per minute, the frame including
a base;
a plurality of independent elongate columns, each column having a first end and second end defining a path of travel along a length, the first end of each column mounted to the base in spaced relation to one another;
a pair of cross members engaged with at least two of the plurality of columns for movement of the cross members in their entirety along the path of travel; and a die support operably engagable with the frame, the die support for low speed mode of operation including:
a first modular die support for low speed mode of operation below 600 linear feet per minute, the first modular die support mounted to the base spaced from the columns in rolling engagement with the first rotary die, the first modular die support maintaining the first rotary die in a stationary rotary position with respect to the base; and
a second modular die support for low speed mode of operation mounted to the cross members spaced from the columns in rolling engagement with the second rotary die to maintain the second rotary die in a stationary rotary position in a horizontally transverse direction with respect to the second axis of rotation, wherein the each of the first and Second modular die supports includes a first bearing assembly and a second bearing assembly positioned in longitudinally spaced locations along the axis of rotation of the first and the second rotary dies, each of the first and the second bearings having at least two rollers with axes of rotation substantially parallel to one another and each roller angularly spaced from one another with respect to the axis of rotation of the corresponding rotary die, wherein the first rotary die includes a first end surface and an opposite second end surface, the first rotary die having a radically raised flange adjacent to the first and second end surfaces, the first and the second rollers operably axially engage the corresponding raised radial flange along the first axis of rotation to limit linear translation of the first rotary die along the first axis of rotation wherein the second rotary die includes a first end and an opposite second end positioned between and operably, axially engaged with the raised radial flanges along the second axis of rotation to limit longitudinal translation of the second rotary die with respect to the first rotary die.

4. A modularly rotary die apparatus having a first rotary die with a first axis of rotation and a second rotary die with a second axis of rotation parallel to the first axis of rotation comprising:
- a frame having a low speed mode of operation below 600 linear feet per minute, the frame including:
  - a base;
  - a plurality of elongate columns having a first end mounted to the base and a second end;
  - a pair of cross members positioned opposite the base operably engaged with at least two of the columns adjacent the second ends; and
- a die support operably engagable with the frame, the support for low speed mode of operation including:
  - a first modular die support mounted to the base spaced from the columns and consisting of a first bearing member and a second bearing member positioned in longitudinally spaced locations along the axis of rotation of the first rotary die, each bearing member including at least two rollers with axes of rotation located in angular spaced positions with respect to and parallel to the axis of rotation of the first rotary die, the second bearing members in rolling engagement with the first rotary die and maintaining the first rotary die in a stationary rotary position with respect to the base through operable axis engagement of the rollers with raised radial flanges located on opposite longitudinal ends of the first rotary die; and
  - a second modular die support mounted to the cross members, the second modular die support consisting of a first bearing member and a second bearing member positioned in longitudinally spaced locations along the axis of rotation of the second rotary die, each bearing member including at least two rollers with axes of rotation located in angularly spaced positions with respect to and parallel to the axis of rotation of the second rotary die, the first and second bearing members in rolling engagement with the second rotary die and maintaining the second rotary die in a stationary rotary position with respect to the base through operable axis engagement of the raised radial flanges on the first rotary die with longitudinal ends of the second rotary die.

* * * * *